US008428576B2

(12) United States Patent
Mattisson et al.

(10) Patent No.: US 8,428,576 B2
(45) Date of Patent: Apr. 23, 2013

(54) METHODS, TEST SYSTEMS AND ARRANGEMENTS FOR VERIFYING COMPLIANCE WITH REQUIREMENT SPECIFICATIONS

(75) Inventors: Leif Mattisson, Södra Sandby (SE); Béla Rathonyi, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 12/990,718

(22) PCT Filed: May 6, 2009

(86) PCT No.: PCT/EP2009/055455
§ 371 (c)(1),
(2), (4) Date: Jan. 5, 2011

(87) PCT Pub. No.: WO2009/135864
PCT Pub. Date: Nov. 12, 2009

(65) Prior Publication Data
US 2011/0092202 A1     Apr. 21, 2011

Related U.S. Application Data

(60) Provisional application No. 61/051,117, filed on May 7, 2008, provisional application No. 61/061,179, filed on Jun. 13, 2008.

(30) Foreign Application Priority Data

Jan. 23, 2009    (EP) .................................... 09151171

(51) Int. Cl.
*H04W 24/00*     (2009.01)
*H04W 36/00*     (2009.01)
(52) U.S. Cl.
USPC .................... 455/423; 455/426.1; 455/552.1; 455/436; 370/328

(58) Field of Classification Search ............... 455/422.1, 455/423–426.2, 436–444, 552.1, 553.1; 370/241–253
See application file for complete search history.

(56) References Cited

U.S. PATENT DOCUMENTS

| | | | | |
|---|---|---|---|---|
| 6,680,913 | B1 * | 1/2004 | Malmivirta et al. | 370/249 |
| 2002/0183053 | A1 * | 12/2002 | Gopalakrishna et al. | 455/423 |

(Continued)

FOREIGN PATENT DOCUMENTS

| | | |
|---|---|---|
| WO | 98/43455 | 10/1998 |
| WO | 00/51380 | 8/2000 |

OTHER PUBLICATIONS

3GPP TS 34.109 V6.2.0, 3rd Generation Partnership Project; Technical Specification Group Radio Access Network; Terminal logical test interface; Special conformance testing functions (Release 6), published Sep. 2006.*
European Telecommunications Standards Institute. ETSI TS 134 109, V6.2.0 (Sep. 2006). Universal Mobile Telecommunications System (UMTS); Terminal logical test interface; Special conformance testing functions (3GPP TS 34.109 version 6.2.0 Release 6).

*Primary Examiner* — Lester Kincaid
*Assistant Examiner* — Daniel Lai
(74) *Attorney, Agent, or Firm* — Coats & Bennett, P.L.L.C.

(57) ABSTRACT

A method for verifying compliance of a communication device with one or more requirement specifications is disclosed. The method comprises establishing a link between a test system and the communication device, wherein the establishing comprises configuring one or more bearers and one or more control channels; closing a test loop comprising the test system and the communication device, wherein the closing comprises activating a test loop function of the communication device; sending data in a downlink of the test loop from the test system to the communication device; receiving the data at the communication device; transferring at least some of the data to an uplink transmission arrangement of the communication device after a specific event has occurred; and verifying, at the test system, transmission in an uplink of the test loop from the communication device to the test system. Corresponding test system and test loop function arrangement are also disclosed.

16 Claims, 5 Drawing Sheets

U.S. PATENT DOCUMENTS

2004/0170149 A1* 9/2004 Lee .............................. 370/338
2005/0037761 A1* 2/2005 Baker et al. .................. 455/442
2006/0239228 A1* 10/2006 Matsuki ........................ 370/331
2006/0245368 A1* 11/2006 Ladden et al. ................ 370/248

* cited by examiner

| Version | Length | Service Type | Total Length | |
|---|---|---|---|---|
| Identification | | | Flags | Fragment Offset |
| Time to Live | | Protocol | Header Checksum | |
| Source IP Address | | | | |
| Destination IP Address | | | | |
| IP Options (optional) | | | | Padding |
| Data | | | | |

Fig. 5

METHODS, TEST SYSTEMS AND ARRANGEMENTS FOR VERIFYING COMPLIANCE WITH REQUIREMENT SPECIFICATIONS

TECHNICAL FIELD

The present invention relates generally to the field of verifying compliance with requirement specifications. More particularly, it relates to verifying compliance of a communication device with requirement specifications regarding uplink transmission and/or downlink reception.

BACKGROUND

In the course of developing standardizations for communication technologies, requirement specifications are often provided. The requirement specifications are developed to support requirement testing of communication devices and to be used in such conformance test activities. The purpose of the requirement testing is to show that a communication device is compliant with the relevant communication standard this is shown by demonstrating fulfillment of the requirement specifications. Various requirement (or test) specifications commonly cover different aspects of the relevant standard such as, for example, compliance with control signaling aspects, correct data transfer, and performance within certain limits under certain conditions.

A common way to perform requirement testing of communication devices is to connect the communication device to a test tool (test system) and let the test system initiate different aspects of the communication device functionality. The test system then verifies that the communication device performs its tasks in compliance with the requirement specifications.

When terminal communication devices are to undergo requirement testing, a common prerequisite to enable test automation and to achieve repeatability of test results is that the terminal communication device comprises some specific test functions.

When testing certain aspects of communication standards, Mobile Originated (MO) data transfer is required. Mobile Originated data refers to data that is to be transmitted from a terminal communication device to a communication network, for example data transmitted in an uplink (UL) of a radio link in UTRA (UMTS Terrestrial Radio Access). To enable testing of such scenarios, test functions in the terminal communication device are needed to trigger and generate MO data transfer in the uplink (i.e. data transmission by the device under test).

To this end, the specific test functions in the terminal communication device may comprise a function adapted to loopback data. For example, such a function may be adapted to return data that was transmitted by the test system to the terminal communication device by transmitting the same data back to the test system.

This technique to loopback data is commonly used to test compliance in relation to different communication technologies, for example mobile communications technologies in relation to UTRA as specified in the 3GPP (3$^{rd}$ Generation Partnership Project) specification TS 34.109 "Terminal logical test interface; Special conformance testing functions".

Examples of communication standards relevant for the purposes of embodiments of the present invention are GPRS (General Packet Radio Service), UMTS (Universal Mobile Telecommunication Standard) and UMTS LTE (UMTS— Long Term Evolution). In the following the description of problems, which arise in connection with existing requirement testing methods and devices, and of the solutions thereof according to embodiments of the invention will be described with focus on UMTS LTE. It is emphasized, however, that the invention is by no ways limited to this communication standard, bur is equally applicable to requirement testing in relation to other communication as will be readily understood by the skilled person.

It is to be noted that all references to 3GPP specifications are to be understood as references to the versions of the specifications as published on the home page of 3GPP on May 6, 2008.

The 3GPP standard for UMTS LTE specifies how a terminal communication device should behave when it has data pending for transmission in the uplink. In order to verify such behavior, specific test functions to trigger and generate data for transmission in the uplink are required. In TS 34.109 referenced above, test functions have been defined for UTRA that perform loopback of data received from the test system in the downlink (DL) so that the data is returned in the uplink. In the test functions defined in TS 34.109 each data unit received in the downlink is directly returned in the uplink. Further, these test functions are based on that data units received in the downlink on a bi-directional radio bearer is directly forwarded to the uplink for transmission on the same radio bearer.

In order to be able to verify the terminal behavior for certain scenarios, there is a need to have means to control (e.g. from the test system) when the data sent in the downlink is to become available for transmission in the uplink in the terminal. Such a scenario might be a connection re-establishment after radio link failure when the terminal has data pending for transmission in the uplink (see e.g. R5-081618 (available from ftp://www.3gpp.org/tsg_ran/WG5_Test_ex-T1/TSGR5_39_KansasCity/Tdoc/R5-081618.zip), 3GPP RAN5 work plan for TS 36.523-1; R5-081618 is to be included in TS 36.523-1, "Evolved Universal Terrestrial Radio Access (E-UTRA) and Evolved Packet Core (EPC); User Equipment (UE) conformance specification; Part 1: Protocol conformance specification").

Similarly, there is also a need to be able to verify terminal communication device behavior for certain mobility scenarios, for example for a handover between different radio access technologies (RATs) (see e.g. R5-081618 as specified above).

To be able to verify terminal behavior for such scenarios, the test system needs to be able to control the timing relation between certain events and actions in the test procedure.

The 3GPP specifications TS 23.401, "General Packet Radio Service (GPRS) enhancements for Evolved Universal Terrestrial Radio Access Network (E-UTRAN) access" and TS 24.301, "Non-Access-Stratum (NAS) protocol for Evolved Packet System (EPS); Stage 3" define terminal behavior in respect of how the terminal should map Service Data Flows (SDF) to EPS-bearers to achieve necessary QoS (Quality of Service) based on a configured filtering mechanism (UL TFT—Uplink Traffic Flow Template). UL TFT is an example of packet filtering which is a more general term applicable also to other communication standards. The UL TFT may, for example, specify type(s) of service, port number(s), etc for different Service Data Flows. Similar functionality for how the uplink IP (Internet Protocol) packet flows are mapped to the correct bearer (e.g. the correct PDP (Packet Data Protocol) context) via UL TFT is also described in TS 23.060, "General Packet Radio Service (GPRS); Service description; Stage 2" and TS 24.008, "Mobile radio interface Layer 3 specification; Core network protocols; Stage 3".

Test loops, such as those specified in TS 34.109 as reference above, do not provide loopback functionality required to verify correct UL TFT handling by the terminal device. Thus, means are needed to be able to test correct behavior of the terminal in respect of UL TFT functionality. There is a need to test handling of UL TFT within a same radio access technology. If for example new EPS-bearers or PDP-contexts are activated, or EPS-bearers or PDP-contexts are released or modified while the terminal remains within one and the same RAT. There is also a need to test handling of UL TFT when the terminal experiences a handover between radio access technologies. For example, after an E-UTRA to UTRA handover, EPS-bearers are replaced by PDP-contexts. Thus, correct handling of this situation in relation to UL TFT needs to be verified.

Therefore, there is a need for methods, arrangements and test systems that enables requirement testing of scenarios where the timing relation between certain events and actions in the test procedure needs to be controlled. There is also a need for methods, arrangements and test systems that enables requirement testing of scenarios where packet filtering is applied.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods, test systems and arrangements for verifying compliance with requirement specifications.

According to a first aspect of the invention this is achieved by a method for verifying compliance of a communication device with one or more requirement specifications. The method comprises establishing a link between a test system and the communication device, wherein the establishing comprises configuring one or more bearers and one or more control channels; closing a test loop comprising the test system and the communication device, wherein the closing comprises activating a test loop function of the communication device; sending data in a downlink of the test loop from the test system to the communication device; receiving the data at the communication device; transferring at least some of the data to an uplink transmission arrangement of the communication device after a specific event has occurred; and verifying, at the test system, transmission in an uplink (116) of the test loop from the communication device to the test system.

In some embodiments, the step of verifying transmission in the uplink may comprise verifying that the data transferred to the uplink transmission arrangement is transmitted correctly in the uplink by the communication device.

In some embodiments, the specific event may be one or more of the elapse of a specific amount of time from the reception of the data, a transmission of a specific command from the test system to the communication device, and a registration of a test operator action performed on at least one of the test system and the communication device.

In some embodiments, the specific event may be a disconnection of the link. In such embodiments, the method may further comprise verifying, at the test system, that a link re-establishment procedure is executed correctly by the communication device.

In some embodiments, the method may further comprise disconnecting the link after the step of sending the data in the downlink and before the specific event has occurred; and verifying, at the test system, that a link re-establishment procedure is executed correctly by the communication device.

The link may be a radio link and the bearers may be radio bearers in some embodiments.

The method may, in some embodiments, further comprise simulating an intra-system cell handover event by transmitting a cell handover command from the test system to the communication device after the step of sending the data in the downlink and before the specific event has occurred; and verifying, at the test system, that an intra-system cell handover procedure is executed correctly by the communication device.

The method may, in some embodiments, further comprise simulating a radio access technology handover event by transmitting a radio access technology handover command from the test system to the communication device after the step of sending the data in the downlink and before the specific event has occurred; and verifying, at the test system, that a radio access technology handover procedure is executed correctly by the communication device.

In some embodiments, the step of activating the test loop function may comprise sending an indicator defining the specific event from the test system to the communication device.

In some embodiments, the step of establishing the link between the test system and the communication device may further comprise configuring one or more uplink packet filters; the step of sending data in the downlink of the test loop from the test system to the communication device may comprise sending units of data associated with different service data flows and including, in each of the units of data, information representing the service data flow associated with the unit of data; and the step of verifying transmission in the uplink may comprise verifying that each of the units of data is transmitted, by the communication device, on a correct bearer corresponding to the service data flow associated with the respective unit of data according to the one or more uplink packet filters.

A second aspect of the invention is a computer program product comprising a computer readable medium, having thereon a computer program comprising program instructions, the computer program being loadable into a data-processing unit of a test system connectable to a communication device for verifying compliance of the communication device with one or more requirement specifications and adapted to cause the test system to execute, when the computer program is run by the data-processing unit, at least the steps of: establishing a link between the test system and a communication device, wherein the establishing comprises configuring one or more bearers and one or more control channels; closing a test loop comprising the test system and the communication device, wherein the closing comprises activating a test loop function of the communication device; sending data in a downlink of the test loop from the test system to the communication device; and verifying transmission in an uplink of the test loop from the communication device to the test system. The step of activating the test loop function comprises sending an indicator defining a specific event from the test system to the communication device, wherein the specific event is for controlling when the communication device transfers at least some of the data to an uplink transmission arrangement of the communication device.

A third aspect of the invention is a computer program product comprising a computer readable medium, having thereon a computer program comprising program instructions, the computer program being loadable into a data-processing unit of a communication device and adapted to cause a test loop function of the communication device to execute, when the computer program is run by the data-processing unit, at least the steps of: receiving an indicator defining a specific event from a test system as part of an activation of a test loop function of the communication device; receiving data in a downlink of the test loop from the test system; and transferring at least some of the data to an uplink transmission arrangement of the communication device after the specific event has occurred.

A fourth aspect of the invention is a test system connectable to a communication device and for verifying compliance of the communication device with one or more requirement specifications. The test system comprises a transmitter, a receiver and processing circuitry. The processing circuitry is adapted to: establish, via the transmitter, a link between the test system and the communication device, wherein the establishing comprises configuring one or more bearers and one or more control channels; and close, via the transmitter and the receiver, a test loop comprising the test system and the communication device, wherein the closing comprises activating a test loop function of the communication device. The transmitter is adapted to send data in a downlink of the test loop from the test system to the communication device, and the receiver and the processing circuitry are adapted to verify transmission in an uplink of the test loop from the communication device to the test system. The processing circuitry is also adapted to send, via the transmitter, an indicator defining a specific event from the test system to the communication device as part of the activation of the test loop function, wherein the specific event is for controlling when the communication device transfers at least some of the data to an uplink transmission arrangement of the communication device.

A fifth aspect of the invention is a test loop function arrangement for integration into a communication device. The arrangement comprises a test control function unit; and a loop back function unit adapted to receive data sent in a downlink of the test loop from a test system and to transfer at least some of the data to an uplink transmission arrangement of the communication device. The test control function unit is adapted to: receive an indicator defining a specific event from the test system as part of activation of the test loop function arrangement; and defer transferring by the loop back function unit of the data to the uplink transmission arrangement until after the specific event has occurred.

A sixth aspect of the invention is a communication device comprising the test loop function arrangement according to the fifth aspect.

A seventh aspect of the invention is an arrangement for verifying requirement specifications comprising at least the test system according to the fourth aspect and the communication device according to the sixth aspect.

In some embodiments, the second through seventh aspects of the invention may additionally have features identical with or corresponding to any of the various features as explained above for the first aspect of the invention.

A test loop as referred to in this application comprises a test loop functionality of a communication device. The communication device is the test object. The test loop further comprises a test system adapted to automate testing of the communication device.

An advantage of some embodiments of the invention is that requirement testing is enabled of scenarios where the timing relation between certain events and actions in the test procedure needs to be controlled.

Another advantage of some embodiments of the invention is that it is made possible to verify terminal communication device compliance in relation to scenarios with MO data transfer Another advantage of some embodiments of the invention is that scenarios where a connection re-establishment should be made due to that data is pending for transmission in the terminal may be tested.

Another advantage of some embodiments of the invention is that requirement testing is enabled of scenarios where packet filtering is applied.

Another advantage of some embodiments of the invention is that scenarios where an inter-system handover takes place may be tested.

BRIEF DESCRIPTION OF THE DRAWINGS

Further objects, features and advantages of the invention will appear from the following detailed description of embodiments of the invention, with reference being made to the accompanying drawings, in which:

FIG. 5 is a block diagram illustrating example IPv4 header fields.

DETAILED DESCRIPTION

In the following, embodiments of the invention will be described where methods and apparatuses are described which are suitable for use in testing of compliance with one or more requirement specifications.

The test functions defined in TS 34.109 as referenced above do not enable any control of the triggering or timing of the data transfer in the uplink. Contrarily, each data unit received in the downlink is directly returned by the test function of the terminal communication device for transmission in the uplink. Furthermore, data units received in the downlink on a bi-directional radio bearer is directly forwarded for transmission in the uplink on the same radio bearer. The timing aspects for the loopback of data as specified in TS 34.109 are restricted to that the terminal, within certain conditions, shall keep the loopback delay constant. The loopback delay cannot be controlled by the test system, but is simply specified as a maximum delay value.

In order to be able to verify the terminal behavior for certain scenarios, there is a need to have means to control (e.g. from the test system) when the data sent in the downlink is to become available for transmission in the uplink in the terminal. Such a scenario might be a connection re-establishment after radio link disconnection (e.g. due to radio link failure) since the terminal has data pending for transmission in the uplink. Another example scenario may be that data is pending after a handover to another radio access technology or to another cell within the same radio access technology.

To be able to verify correct behavior in such scenarios it is crucial to be able to control the timing relation between the disconnection of the link (or the handover) and the triggering of data transmission in the uplink.

In the case of radio access technology (RAT) handover it is also important to be able to verify continuation of data transmission before and after the RAT handover. Thus, a test loop must be provided that can be maintained throughout the RAT handover, i.e. the test loop should not be canceled due to radio access system changes. For this purpose a radio access transparent test loop mode is needed.

Figure 1:
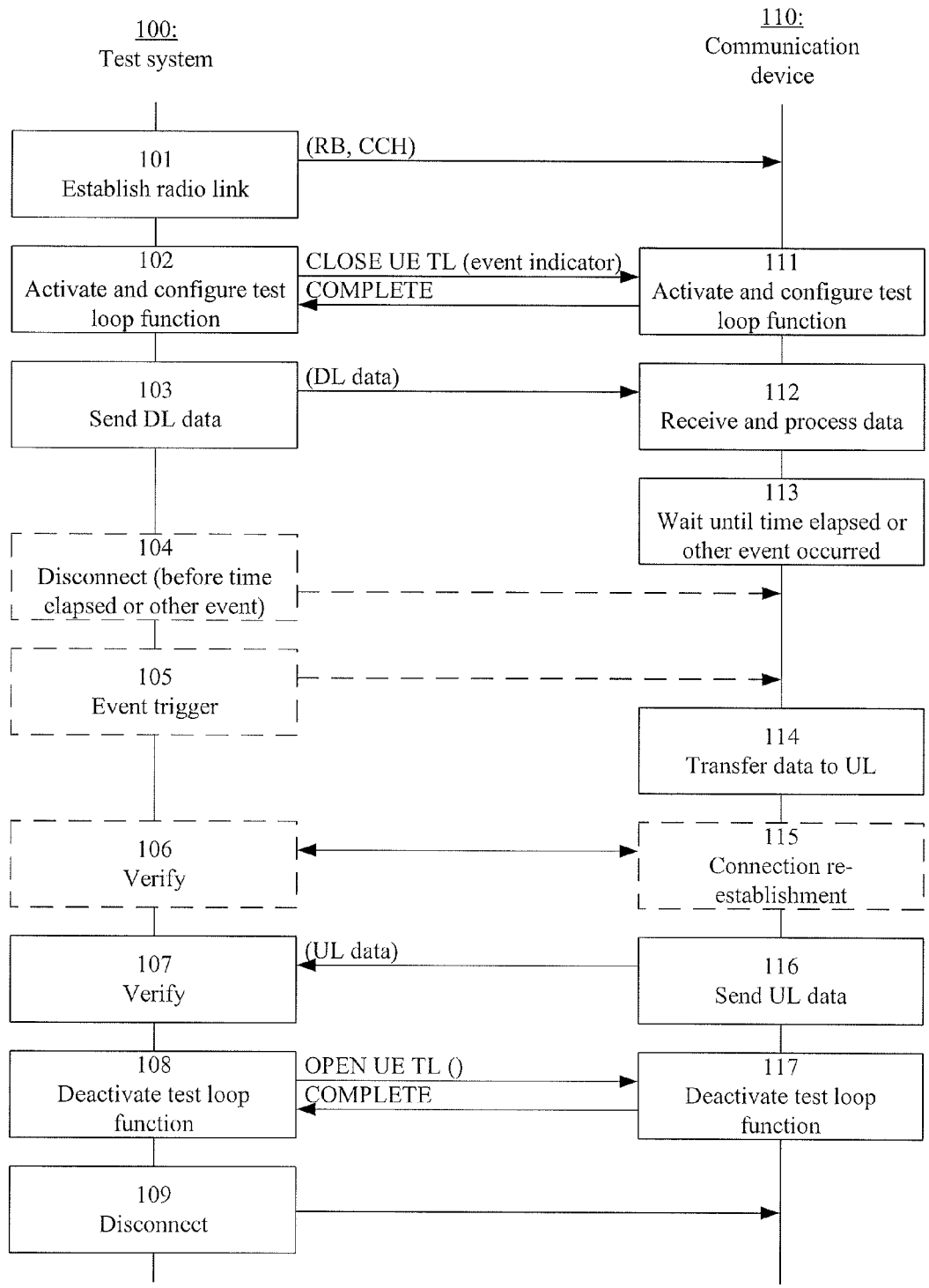
FIG. 1 is a signaling flowchart illustrating example method steps according to some embodiments of the invention.

FIG. 1 is a signaling flowchart illustrating example method steps according to some embodiments of the invention and the interaction between a test system 100 and a communication device 110 under test.

The test system 100 is configured to send data to the communication device 110 in a downlink and the communication device 110 is configured to return data received in the downlink for transmission in the uplink to the test system 100. The communication device 110 is further configured to return data for transmission in the uplink only after a specific event has occurred. This enables control over the relative timing of certain events and actions in the test procedure. For example, the test system may trigger a disconnection of the link before the specific event has occurred and thereby ensure that the communication device will have data pending for transmission when the link has been disconnected. Thereby the test system is able to ensure the possibility to verify the connection re-establishment procedure and that data is correctly transmitted after the connection re-establishment.

In step 101, the test system establishes a radio link, and configures the radio bearer(s) and control channel(s) to be used for the test.

In step 102, the test system triggers activation of the dedicated test loop function of the communication device, which responds to the activation triggering in step 111. The activation in steps 102 and 111 may comprise closing of a test loop. The activation may also comprise configuring the test loop function. Alternatively, the test loop function may be partly or fully pre-configured.

In step 103, the test system sends data (e.g. IP packets or layer 2 data units) in the downlink to the communication device, which receives the data in step 112. In step 112, the data received by the communication device may also undergo various processing by the communication device, for example such internal device reception data processing as known in the art. After step 112 (e.g. in connection with steps 116 and 107), verification that the reception of data and the processing of the received data are performed correctly by the communication device may be undertaken.

The dedicated test loop function is configured to transfer all or part of the data received in downlink for transmission on a radio bearer in the uplink (step 114). However, the dedicated test loop function is further configured to only transfer the data for transmission in the uplink after a specific event has occurred (step 113).

The specific event may be the elapse of a specific amount of time from the time the data has been received. This may be realized as a timer in the test loop function. The time may be pre-configured or it may be configured (e.g. by the test system) as part of the activation in steps 102 and 111. It may also be configured by a specific command entered on either or both of the test system and the communication device prior to or after the test function has been activated in steps 102 and 111.

The specific event may also be another event such as the transmission of a specific command from the test system to the communication device (step 105), the registration of an action (such as pressing a key) performed by a test operator on either or both of the test system (step 105) and the communication device. The specific event may also be the disconnection (104) of the radio link established in step 101.

The type of event (elapsed time, command, operator action, link disconnection, etc.) may be pre-configured or it may be configured (e.g. by the test system) as part of the activation in steps 102 and 111. The test system may send an indicator to the communication system that defines the type of event and/or the amount of time to elapse. It may also be configured by specific commands entered on either or both of the test system and the communication device prior to or after the test function has been activated in steps 102 and 111.

The solution with a specific elapsed time has little impact on the implementation of the communication device.

After the communication device has transferred the data for transmission in the uplink in step 114, the same data is transmitted in the uplink in step 116, and receiver by the test system in step 107. When the test system receives the data in step 107, it can do verification of the data. The verification may simply comprise verifying that uplink transmission takes place without verifying that the data is actually correct, or it may comprise also verifying that the data is transmitted correctly in the uplink.

As mentioned above, the verification may additionally or alternatively comprise indirect verification of correct DL reception and/or processing. Such verification is indirect because the verification is performed via returned (UL) data. The test system compares the returned UL data with the data that was sent in the DL. If, for example, the returned UL data is identical with the data that was sent in the DL, this may be verification that the reception and processing of the DL data was performed correctly. Another example is where a test system sends DL data with erroneous header information. Then, the communication device should not accept the data and correct operation of the communication device may be verified in that no data is returned in the UL.

When the test session is completed, the test system triggers the deactivation (opening) of the test loop in step 108, and the communication device responds to the deactivation triggering in step 117. In step 109, the radio link is disconnected.

Before the specific event has occurred, the test system may trigger a disconnection of the radio link between the test system and the communication device under test in step 104.

When the test loop function in the communication device has returned data received in downlink for transmission in the uplink (step 114), the radio link may thus be disconnected. Since the communication device is disconnected and has data pending for transmission in the uplink, a procedure to re-establish the connection is triggered in step 115.

The test system verifies, in step 106, that the communication device performs the connection re-establishment procedure correctly.

The disconnection in step 104 may, for example, simulate a radio link failure. Alternatively or additionally, the test system may, before the specific event has occurred, simulate handover to other intra-system cell or to other RAT and verify that the communication device performs the corresponding procedures correctly. In this case, the specific event may comprise any of the examples as referred to above or it may comprise the handover in itself.

As mentioned, the test loop function in the communication device may be configured to return part or all of the data received on the downlink. For example, some of the data sent in the downlink may be intended for the uplink (e.g. for testing uplink behavior) and is thus returned, while some of the data sent in the downlink may be intended for some other purpose (e.g. for testing of downlink reception) and is thus not returned. Furthermore, if the data is transmitted as packets (e.g. IP packets) in the downlink, it may be only the payload of the packet that is returned for transmission in the uplink. Other content of the packet (such as header information), may be removed, added or changed before transmission in the uplink. The size of the payload may also be changed, for example by repeating the entire or part of the payload, by truncating or puncturing the payload. Furthermore, the size of the entire packet may be changed, if for example the header is changed and/or the size of the payload is changed.

As mentioned the test loop function may be partly or fully preconfigured. There may be a dedicated preconfigured test loop function for each relevant scenario. Alternatively, there may be a single (or a few) test loop functions, which are configured for a specific scenario as part of the activation in steps 102 and 111.

Links and bearers have been described above as radio links and radio bearers, but embodiments of the invention are equally applicable to wired communication systems.

Some embodiments of the invention combine elapsed time and another event triggering in the same solution. For example, the data may be transferred in step 114 directly after an event trigger (105) but at the latest at the elapse of a specific amount of time.

In TS 34.109 (FIG. 5.1.1), a UE test loop function is defined that provides loopback of data for bidirectional radio bearers.

Figure 2:
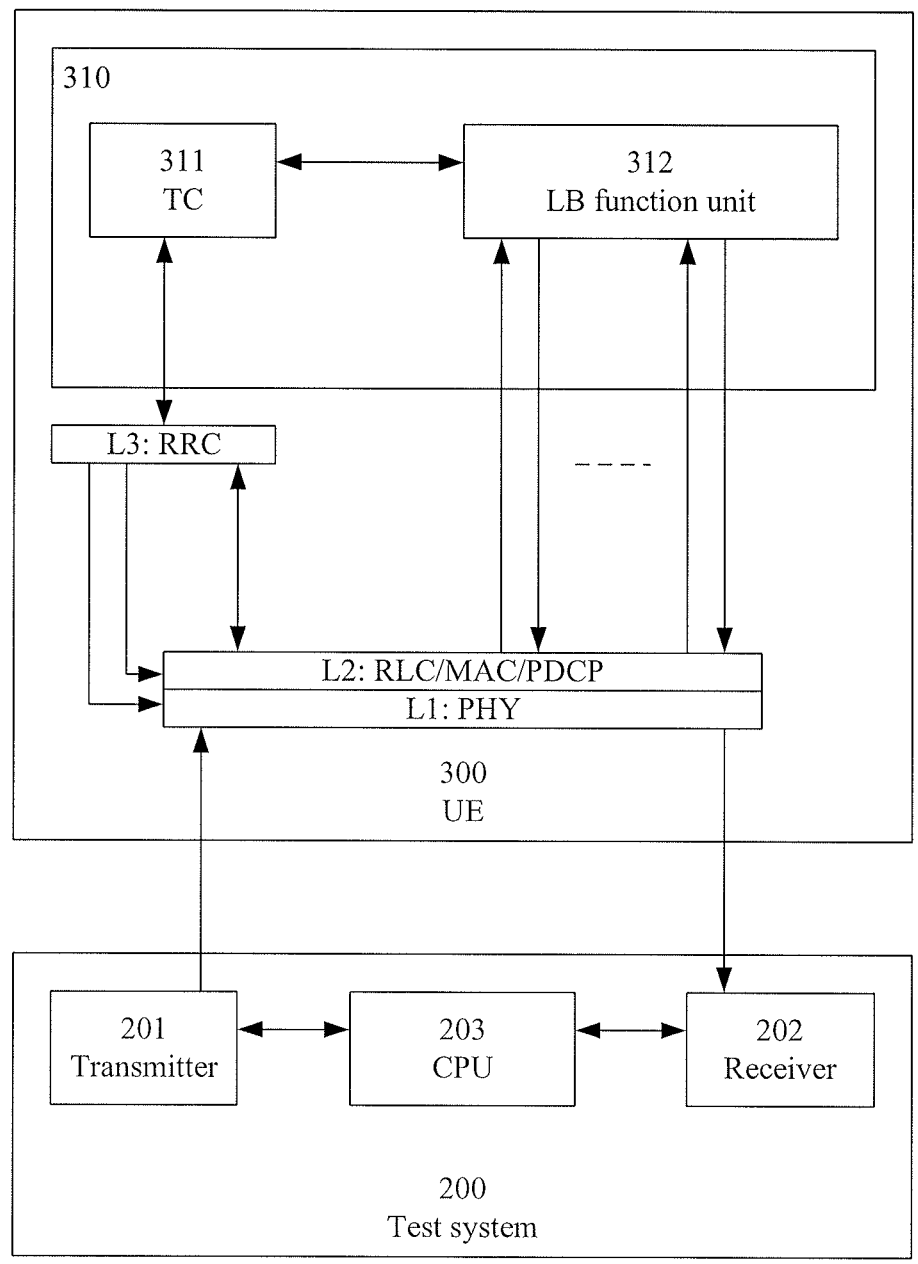
FIG. 2 is a block diagram illustrating an example test system and an example arrangement comprised in a communication device according to some embodiments of the invention.

FIG. 2 is a block diagram illustrating an example test system 200 and an example test loop function arrangement 310 comprised in a communication device 300 according to some embodiments of the invention.

The test system 200 and the communication device 300 may, for example, correspond to the test system 100 and the communication device 110 and the test system 200 and the arrangement 310 may be adapted to perform method steps as described in relation to FIG. 1.

The test system comprises a transmitter 201, a receiver 202 and processing circuitry (e.g. a central processing unit—CPU) 203. These entities may be adapted to perform method steps as described in connection to the test system 100 of FIG. 1.

The test loop function arrangement 310 comprises a test control unit (TC) 311 and a loop back (LB) function unit 312.

According to embodiments of the invention, the LB function unit 312 may include one or more radio bearer loop back (RB LB) entities (not shown). In TS 34.109 (FIG. 5.1.1) a loop back function unit with several radio bearer loop back (RB LB) entities (one per DL/UL RB pair) is shown. Each RBLB entity may be configured to return all or part of the data received from one downlink radio bearer (or a control channel) to an uplink radio bearer. Alternatively, a RBLB entity may be configured to return all or part of the data received from any downlink radio bearer (or a control channel) to any of the configured uplink radio bearers, possibly based on some mapping rules.

The TC function unit 311 is used to control the LB function unit 312. The TC function unit may receive commands via a user interface of the communication device 300, via messages received on an interface external to the communication device 300, or via a radio interface (e.g. E-UTRA radio interface) under testing. An advantage with the latter is that no special external interface needs to be mandated in all devices that are to be tested. For example, a built-in PC module compliant with the UTRA/E-UTRA specification is not required to have an extra external interface (e.g. USB) just for conformance test purposes if this approach is used. The TC function unit provides control over activation and de-activation of the test loop function, over establishment and configuration of RB LB entities, over closing and opening of the test loop, and over event/time delay configuration. The LB function unit is adapted to receive downlink data and to transfer some or all of that data for transmission in the uplink. The transferring of the data may be done under the control of the TC function unit.

The loopback point resides above the access functionality of the communication device, i.e. in a non-access stratum.

The test system 200 and the communication device 300 may further comprise input/output interfaces as generally known in the art. These interfaces may, for example, comprise keys and display(s) and may be used by a test operator when conducting, controlling and monitoring the test.

Figure 3:
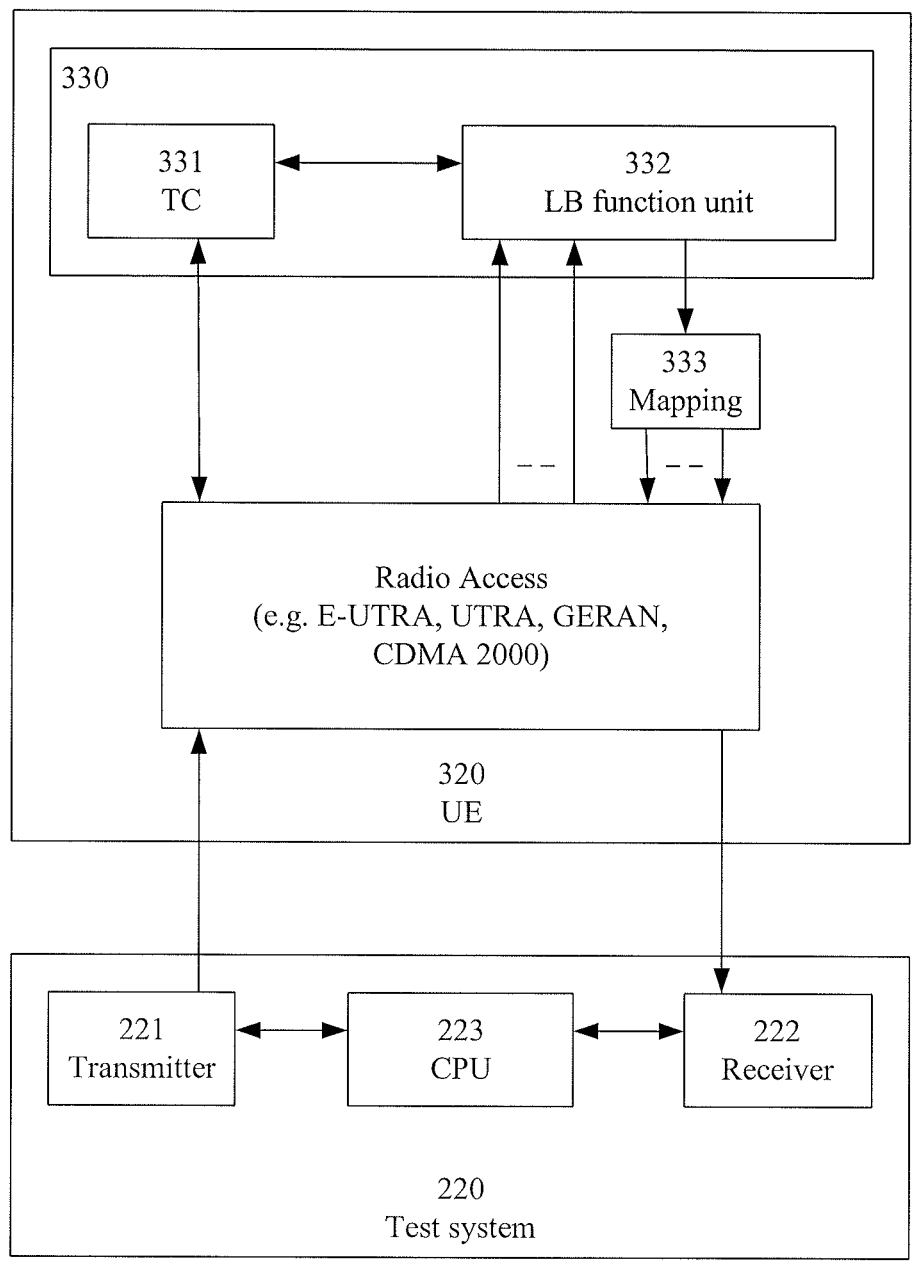
FIG. 3 is a block diagram illustrating an example test system and an example arrangement comprised in a communication device according to some embodiments of the invention.

FIG. 3 is a block diagram illustrating an example test system 220 and an example test loop function arrangement 330 comprised in a communication device 320 according to some embodiments of the invention.

The test system 220 and the communication device 320 may, for example, correspond to the test system 400 and the communication device 410 of FIG. 4, and the test system 220 and the arrangement 330 may be adapted to perform method steps as will be described in relation to FIG. 4.

The test system comprises a transmitter 221, a receiver 222 and processing circuitry (e.g. a central processing unit—CPU) 223. These entities may be adapted to perform method steps as will be described in connection to the test system 400 of FIG. 4.

The test loop function arrangement 330, which may be comprised in the communication device 320, comprises a test control unit (TC) 331 and a loop back (LB) function unit 332 similar to the corresponding units 311 and 312 of FIG. 2. The communication device 320 further comprises a bearer mapping unit 333. The bearer mapping unit 333 may be configured to map data to be transmitted in the uplink to their respective bearer in accordance with corresponding packet filters. The packet filters specify on which bearer data associated with a particular service data flow should be mapped. The packet filters may, for example, be configured by the test system via layer 3 control messages specified by the radio or wired interface under test. For example, for UTRA, E-UTRA and GPRS, the packet filters may be configured by UL TFT information sent in layer 3 control messages.

When a bearer mapping unit 333 is used, there is no need for more than one radio bearer loop back (RB LB) entity in the LB function unit 332. This is because in such an implementation, all the DL loopback data is terminated in the UE LB function 332 and all the UL loopback data is directly forwarded to the bearer mapping unit 333, which handles the further distribution to the correct radio bearer.

The loopback functionality resides above the access functionality of the communication device, i.e. in a non-access stratum. This enables loopback functionality testing of bearer mapping, for example after a link disconnection or a handover event. Thus, the loopback point is above the functionality handling the mapping between SDF(s) (or PDP context(s)) and bearer(s) in the communication device.

In a situation where more than one SDFs (or PDP contexts) are established there is commonly one bearer that is not associated with any packet filter. Thus, all packets that are not filtered out by any of the packet filters should be sent on this bearer. However, not being explicitly associated with any packet filter may also be viewed as a packet filter (e.g. the complement of the union of the packet filters associated with the other bearers). Therefore, when this application mentions units of data being associated with different service data flows, each of the units of data including information representing the service data flow associated with the unit of data, and verifying that each of the units of data is transmitted on a correct bearer corresponding to the service data flow associated with the respective unit of data according to the one or more uplink packet filters, it is understood to also embrace the situation of one bearer not being associated with any packet filter as explained above.

The LB function unit may include functionality to alter some of the header fields of received IP packets before sending them in the uplink. This may include calculating the IP checksum before it is inserted into the header. FIG. 5 illustrates the IPv4 header fields. As an example, if an IP packet is increased or decreased in size as explained above, then the IP header fields "Total Length" and "Header Checksum" are updated.

Figure 4:
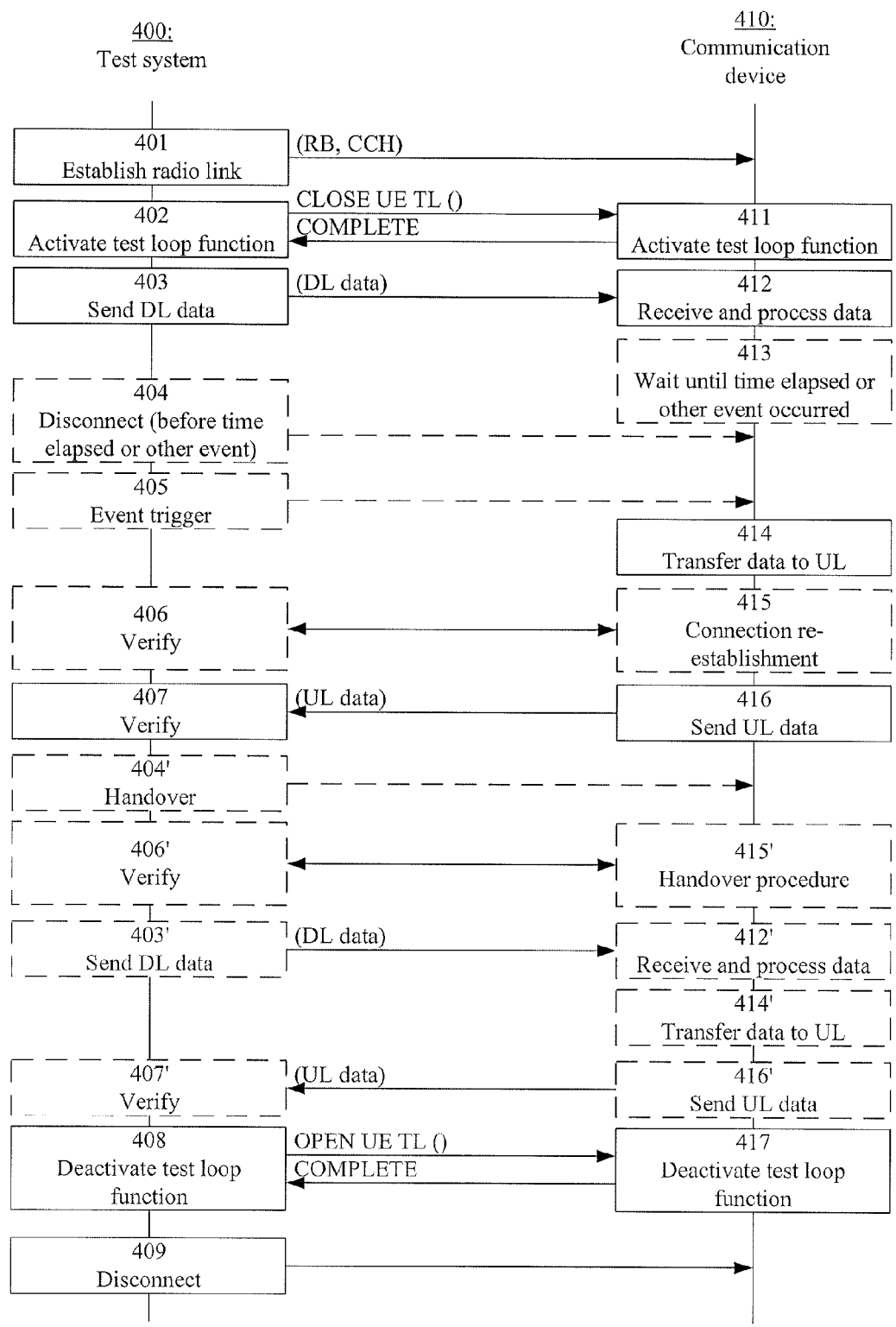
FIG. 4 is a signaling flowchart illustrating example method steps according to some embodiments of the invention.

FIG. 4 is a signaling flowchart illustrating example method steps according to some embodiments of the invention and the interaction between a test system 400 and a communication device 410 under test.

The test method illustrated in FIG. 4 is particularly suitable for verification of communication device behavior in relation to packet filers within one radio access technology and/or after RAT handover (e.g. as configured by UL TFT when the radio link is established).

The test system 400 is configured to send data to the communication device 410 in a downlink and the communication device 410 is configured to return data received in the downlink for transmission in the uplink to the test system 400.

In step 401, the test system establishes a radio link, and configures the radio bearer(s), control channel(s), and packet filter(s) to be used for the test.

In step 402, the test system triggers activation of the dedicated test loop function of the communication device, which responds to the activation triggering in step 411. The activation in steps 402 and 411 may comprise closing of a test loop. The activation may also comprise configuring the test loop function. Alternatively, the test loop function may be partly or fully pre-configured.

In step 403, the test system sends data (e.g. IP packets) in the downlink to the communication device, which receives the data in step 412. In step 412, the data received by the communication device may also undergo various processing by the communication device, for example such internal device reception data processing as known in the art. Each packet sent in the downlink includes header information that simulates that the IP packets represent different service data flows. After step 412 (e.g. in connection with steps 416 and 407), verification that the reception of data and the processing of the received data are performed correctly by the communication device may be undertaken.

The dedicated test loop function is configured to transfer all or part of the data received in downlink for transmission on a radio bearer in the uplink (step 414). When data is returned for transmission in the uplink, the communication device maps the IP packets to different bearers based on the packet filter configuration.

After the communication device has transferred the data for transmission in the uplink in step 414, the same data is transmitted in the uplink in step 416, and receiver by the test system in step 407. When the test system receives the data in step 407, it can do verification of the data. The verification may simply comprise verifying that uplink transmission takes place without verifying that the data is actually correct, or it may comprise also verifying that the data is transmitted correctly in the uplink. The verification in step 407 may comprise verifying that each of the IP packets are transmitted on the correct uplink bearer in accordance with the packet filter configuration and the IP header information set by the test system.

As mentioned above, the verification may additionally or alternatively comprise indirect verification of correct DL reception and/or processing. Such verification is indirect because the verification is performed via returned (UL) data. The test system compares the returned UL data with the data that was sent in the DL. If, for example, the returned UL data is identical with the data that was sent in the DL, this may be verification that the reception and processing of the DL data was performed correctly. Another example is where a test system sends DL data with erroneous header information. Then, the communication device should not accept the data and correct operation of the communication device may be verified in that no data is returned in the UL.

When the test session is completed, the test system triggers the deactivation (opening) of the test loop in step 408, and the communication device responds to the deactivation triggering in step 417. In step 409, the radio link is disconnected.

The communication device 410 may be further configured to return data for transmission in the uplink only after a specific event has occurred. This enables control over the relative timing of certain events and actions in the test procedure. For example, the test system may trigger a disconnection of the link before the specific event has occurred and thereby ensure that the communication device will have data pending for transmission when the link has been disconnected. Thereby the test system is able to ensure the possibility to verify the connection re-establishment procedure and that data is correctly transmitted after the connection re-establishment.

Thus, the dedicated test loop function may optionally also be configured to transfer all or part of the data received in downlink for transmission on a radio bearer in the uplink (step 414) only after a specific event has occurred (step 413).

The specific event may be the elapse of a specific amount of time from the time the data has been received. This may be realized as a timer in the test loop function. The time may be pre-configured or it may be configured (e.g. by the test system) as part of the activation in steps 402 and 411. It may also be configured by a specific command entered on either or both of the test system and the communication device prior to or after the test function has been activated in steps 402 and 411.

The specific event may also be another event such as the transmission of a specific command from the test system to the communication device (step 405), the registration of an action (such as pressing a key) performed by a test operator on either or both of the test system (step 405) and the communication device. The specific event may also be the disconnection (404) of the radio link established in step 401.

The type of event (elapsed time, command, operator action, link disconnection, etc.) may be pre-configured or it may be configured (e.g. by the test system) as part of the activation in steps 402 and 411. The test system may send an indicator to the communication system that defines the type of event and/or the amount of time to elapse. It may also be configured by specific commands entered on either or both of the test system and the communication device prior to or after the test function has been activated in steps 402 and 411.

The solution with a specific elapsed time has little impact on the implementation of the communication device.

Before the specific event has occurred, the test system may trigger a disconnection of the radio link between the test system and the communication device under test in step 404. When the test loop function in the communication device has returned data received in downlink for transmission in the uplink (step 414), the radio link may thus be disconnected. Since the communication device is disconnected and has data pending for transmission in the uplink, a procedure to reestablish the connection is triggered in step 415.

The test system verifies, in step 406, that the communication device performs the connection re-establishment procedure correctly.

The disconnection in step 404 may, for example, simulate a radio link failure. Alternatively or additionally, the test system may, before the specific event has occurred, simulate handover to other intra-system cell or to other RAT and verify that the communication device performs the corresponding procedures correctly. In this case, the specific event may comprise any of the examples as referred to above or it may comprise the handover in itself.

As mentioned, the test loop function in the communication device may be configured to return part or all of the data received on the downlink. For example, some of the data sent in the downlink may be intended for the uplink (e.g. for testing uplink behavior) and is thus returned, while some of the data sent in the downlink may be intended for some other purpose (e.g. for testing of downlink reception) and is thus not returned. Furthermore, if the data is transmitted as packets (e.g. IP packets) in the downlink, it may be only the payload of the packet that is returned for transmission in the uplink. Other content of the packet (such as header information), may be removed, added or changed before transmission in the uplink. The size of the payload may also be changed, for example by repeating the entire or part of the payload, by truncating or puncturing the payload. Furthermore, the size of the entire packet may be changed, if for example the header is changed and/or the size of the payload is changed.

As mentioned the test loop function may be partly or fully preconfigured. There may be a dedicated preconfigured test loop function for each relevant scenario. Alternatively, there may be a single (or a few) test loop functions, which are configured for a specific scenario as part of the activation in steps 402 and 411.

Links and bearers have been described above as radio links and radio bearers, but embodiments of the invention are equally applicable to wired communication systems.

Some embodiments of the invention combine the optional alternatives of elapsed time and another event triggering in the same solution. For example, the data may be transferred in step 414 directly after an event trigger (405) but at the latest at the elapse of a specific amount of time.

If it is desired to verify the communication device behavior for packet filtering after, for example, a radio access technology handover has occurred, the following steps may be added to the method.

The test system may initiate a change of radio access technology by sending the corresponding handover command to the communication device (step 404'). Alternatively or additionally, the test system may simulate a handover to other intra-system cell. A handover procedure is thus triggered and responded to by the communication device in step 415'. The test system verifies, in step 406', that the communication device performs the handover procedure correctly.

In step 403', the test system sends further data (e.g. IP packets) in the downlink to the communication device, which receives the further data in step 412'. In step 412', the data received by the communication device may also undergo various processing by the communication device, for example such internal device reception data processing as known in the art. Again, each packet sent in the downlink includes header information that simulates that the IP packets represent different service data flows.

The dedicated test loop function transfers all or part of the further data for transmission on a radio bearer in the uplink (step 414'). When the further data is returned for transmission in the uplink, the communication device maps the IP packets to different bearers based on the packet filter configuration.

After the communication device has transferred the further data for transmission in the uplink in step 414', the same further data is transmitted in the uplink in step 416', and receiver by the test system in step 407'. When the test system receives the further data in step 407', it can do verification of the further data. The verification may simply comprise verifying that uplink transmission takes place without verifying that the further data is actually correct, or it may comprise also verifying that the further data is transmitted correctly in the uplink. The verification in step 407' may comprise verifying that each of the IP packets of the further data is transmitted on the correct uplink bearer in accordance with the packet filter configuration and the IP header information set by the test system, i.e. that the bearer mapping is correct even after the handover.

Embodiments of the invention make it possible to verify communication device compliance with scenarios for mobile originated data. This is applicable to, for example, scenarios for connection re-establishment when data is pending for transmission in the communication device. The verifications of compliance to such scenarios are important to secure compliance of the communication device with standardized behavior to be able to guarantee the quality of service that end users will expect.

Embodiments of the invention also make it possible to test data continuation during mobility cases, such as RAT handover, e.g. between E-UTRAN to E-UTRA, and cell handover.

Embodiments of the invention also make it possible to test packet filter (e.g. UE UL TFT) functionality and data continuation during mobility cases, such as RAT handover, e.g. between E-UTRAN to E-UTRA, and cell handover.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or hand-held mobile radio communication equipment, a mobile radio terminal, a mobile telephone, a communicator, an electronic organizer, a smartphone, a computer, a notebook, or a mobile gaming device.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal or a test system. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 1 and 4.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

It is also emphasized that features of one embodiment may be combined with features of another embodiment in various working combinations.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method for verifying compliance of a communication device with one or more requirement specifications, the method comprising:
   establishing a link between a test system and the communication device;
   closing a test loop comprising the test system and the communication device;
   sending data in a downlink of the test loop from the test system to the communication device;
   receiving the data at the communication device;
   disconnecting the link after sending the data in the downlink but before a specific event has occurred;
   transferring at least some of the data to an uplink transmission arrangement of the communication device after the specific event has occurred;
   verifying, at the test system, that a link re-establishment procedure is executed correctly by the communication device; and
   verifying, at the test system, transmission in an uplink of the test loop from the communication device to the test system.

2. The method of claim 1, wherein verifying transmission in the uplink comprises verifying that the data transferred to the uplink transmission arrangement is transmitted correctly in the uplink by the communication device.

3. The method of claim 1, wherein the specific event is the elapse of a specific amount of time from the reception of the data at the communication device.

4. The method of claim 1, wherein the specific event is a transmission of a specific command from the test system to the communication device.

5. The method of claim 1, wherein the specific event is a registration of a test operator action performed on at least one of the test system and the communication device.

6. The method of claim 1, wherein the link is a radio link, wherein disconnecting the link comprises simulating an intra-system cell handover event by transmitting a cell handover command from the test system to the communication device, and wherein verifying that a link re-establishment procedure is executed correctly comprises verifying, at the test system, that an intra-system cell hand over procedure is executed correctly by the communication device.

7. The method of claim 1, wherein the link is a radio link, wherein disconnecting the link comprises simulating a radio access technology handover event by transmitting a radio access technology handover command from the test system to the communication device, and wherein verifying that a link re-establishment procedure is executed correctly comprises verifying, at the test system, that a radio access technology handover procedure is executed correctly by the communication device.

8. The method of claim 1, wherein closing the test loop comprises activating a test loop function of the communication device, said activation including sending an indicator defining the specific event from the test system to the communication device.

9. The method of claim 1:
   wherein establishing the link between the test system and the communication device comprises configuring one or more bearers and configuring one or more uplink packet filters;
   wherein sending data in the downlink of the test loop comprises sending units of data associated with different service data flows and including, in each unit of data, information representing the service data flow associated with that unit of data; and
   wherein verifying transmission in the uplink comprises verifying that each unit of data is transmitted, in accordance with the one or more uplink packet filters, on a correct bearer corresponding to the service data flow associated with that unit of data.

10. A computer program product comprising a non-transitory computer readable medium, having thereon a computer program comprising program instructions, the computer program being loadable into a data-processing unit of a test system connectable to a communication device for verifying compliance of the communication device with one or more requirement specifications, the computer program, when run by the data-processing unit, configured to cause the test system to:
   establish a link between the test system and the communication device;
   close a test loop comprising the test system and the communication device by activating a test loop function of the communication device, wherein activating the test loop function comprises sending an indicator from the test system to the communication device that defines a specific event;
   send data in a downlink of the test loop from the test system to the communication device;
   disconnect the link after sending the data in the downlink but before the specific event has occurred, the specific event controlling when the communication device transfers at least some of the data to an uplink transmission arrangement of the communication device;
   verify that a link re-establishment procedure is executed correctly by the communication device; and
   verify transmission in an uplink of the test loop from the communication device to the test system.

11. A test system connectable to a communication device and for verifying compliance of the communication device with one or more requirement specifications, the test system comprising a transmitter, a receiver, and processing circuitry, the processing circuitry configured to:

establish, via the transmitter, a link between the test system and the communication device; and close, via the transmitter and the receiver, a test loop comprising the test system and the communication device by activating a test loop function of the communication device, wherein activating the test loop function comprises sending, via the transmitter, an indicator from the test system to the communication device that defines a specific event;

send data, via the transmitter, in a downlink of the test loop from the test system to the communication device;

disconnect the link after the transmitter has sent the data in the downlink but before the specific event has occurred, the specific event controlling when the communication device transfers at least some of the data to an uplink transmission arrangement of the communication device;

verify that a link re-establishment procedure is executed correctly by the communication device; and verify transmission in an uplink of the test loop from the communication device to the test system.

12. The test system of claim 11, wherein the processing circuitry is configured to verify transmission in the uplink by verifying that the data is transmitted correctly in the uplink by the communication device.

13. The test system of claim 11, wherein the link is a radio link, and wherein the processing circuitry is configured to:

simulate an intra-system cell handover event by transmitting, via the transmitter, a cell handover command to the communication device after the transmitter has sent the data in the downlink but before the specific event has occurred; and verify that an intra-system cell handover procedure is executed correctly by the communication device.

14. The test system of claim 11, wherein the link is a radio link, and wherein the processing circuitry is configured to:

simulate a radio access technology handover event by transmitting, via the transmitter, a radio access technology handover command to the communication device after the transmitter has sent the data in the downlink but before the specific event has occurred; and verify that a radio access technology handover procedure is executed correctly by the communication device.

15. The test system of claim 11, wherein the data comprises units of data associated with different service data flows, and wherein the processing circuitry is configured to:

configure, via the transmitter, one or more bearers and one or more uplink packet filters;

include, in each unit of data, information representing the service data flow associated with that unit of data; and verify that each unit of data is transmitted, in accordance with the one or more uplink packet filters, on a correct bearer corresponding to the service data flow associated with the respective unit of data.

16. An arrangement for verifying requirement specifications comprising at least a communication device and a test system, the test system configured to verify compliance of the communication device with the requirement specifications and comprising a transmitter, a receiver, and processing circuitry, the processing circuitry configured to:

establish a link between the test system and the communication device;

close a test loop comprising the test system and the communication device by activating a test loop function of the communication device, wherein activating the test loop function comprises sending an indicator from the test system to the communication device that defines a specific event;

send data in a downlink of the test loop from the test system to the communication device;

disconnect the link after sending the data in the downlink but before the specific event has occurred, the specific event controlling when the communication device transfers at least some of the data to an uplink transmission arrangement of the communication device;

verify that a link re-establishment procedure is executed correctly by the communication device; and verify transmission in an uplink of the test loop from the communication device to the test system.

* * * * *